US011356039B2

(12) United States Patent
Steen

(10) Patent No.: US 11,356,039 B2
(45) Date of Patent: Jun. 7, 2022

(54) DEVICE AND METHOD FOR TRANSFERRING ELECTRICAL POWER TO A HIGH-SPEED ROTATING OBJECT

(71) Applicant: VAON, LLC, Bowling Green, KY (US)

(72) Inventor: Henry B. Steen, Bowling Green, KY (US)

(73) Assignee: VAON, LLC, Bowling Green, KY (US)

( * ) Notice: Subject to any disclaimer, the term of this patent is extended or adjusted under 35 U.S.C. 154(b) by 212 days.

(21) Appl. No.: 16/790,880

(22) Filed: Feb. 14, 2020

(65) Prior Publication Data

US 2021/0257936 A1    Aug. 19, 2021

(51) Int. Cl.
*H02N 2/00* (2006.01)
*B23B 47/00* (2006.01)
*H02N 2/10* (2006.01)

(52) U.S. Cl.
CPC .......... *H02N 2/0085* (2013.01); *B23B 47/00* (2013.01); *H02N 2/0055* (2013.01); *H02N 2/103* (2013.01)

(58) Field of Classification Search
CPC .... H02N 2/0085; H02N 2/0055; H02N 2/103; B23B 47/00; B23B 37/00; B23B 2260/108; B23Q 5/043; B23Q 1/0009
See application file for complete search history.

(56) References Cited

U.S. PATENT DOCUMENTS

| 3,614,484 A | * | 10/1971 | Shoh | B24B 35/005 310/325 |
| 8,002,251 B2 | * | 8/2011 | Hindle | B64G 1/286 267/140.15 |
| 2007/0251729 A1 | * | 11/2007 | Sand | E21B 4/00 175/107 |
| 2008/0196912 A1 | * | 8/2008 | Gass | B25F 5/021 173/4 |

* cited by examiner

*Primary Examiner* — Emily P Pham
(74) *Attorney, Agent, or Firm* — Hollowell Patent Group; Kelly Hollowell

(57) ABSTRACT

A device and method using the electromechanical properties of piezoelectric materials to generate and deliver electrical power to a high speed electrically powered rotatable shaft. The device has a stationary module that is connected to an electrical source; and has a rotatable module, which is mechanically connected to the electrically powered rotatable shaft. The rotatable module rotates relative to the stationary module. When the stationary module is electrically energized, the stationary piezoelectric component expands and causes the rotatable piezoelectric component to compress. When the rotatable piezoelectric component compresses, it generates electrical power transferred to the electrically powered rotatable shaft. Thus, electrical energy can be delivered to the electrically powered rotatable shaft without a direct electrical connection. The present invention is particularly useful in applications requiring large diameter through-hole dimensions.

18 Claims, 6 Drawing Sheets

DEVICE AND METHOD FOR TRANSFERRING ELECTRICAL POWER TO A HIGH-SPEED ROTATING OBJECT

FIELD OF USE

The Method and Device can be used to generate and deliver electrical power to an object that is spinning or rotating at high rotational speeds. One example of use is transferring power to a device located on the spindle shaft of a drilling machine or a drill press using the electromechanical properties of piezoelectric materials to transfer mechanical energy to the rotating portion of the spindle shaft and converting the mechanical energy to electricity on the rotating portion of the spindle shaft. Thus, electrical energy can be delivered to the spinning device without a direct electrical connection to the non-spinning portion of the drilling machine. The present invention is particularly useful in applications requiring large diameter through-hole dimensions.

Definitions

"Polarized Electrostrictive" hereafter will be synonymous with "Piezoelectric"

BACKGROUND OF THE INVENTION

Absent the present invention, the following are several ways to transfer electrical power to a rotating object.

First, slip rings are the most common way to transfer electrical power to spinning objects. If the application requires a through bore hole diameter in excess of 3 inches, slip rings are generally limited to rotational speeds of less than 5,000 rpm. Second, a rotary transformer can be used to electromagnetically transfer electrical power across an air gap to a rotating shaft. These devices are difficult to manufacture and few if any are available commercially. Third, a rotary capacitor can be used to transfer electric charge across an air gap, but these devices are also extremely difficult to manufacture and few if any are available commercially.

The present invention was invented to solve an electrical power transfer problem for a spindle mounted high-power ultrasonic drilling system operating at high rotational speeds. Absent the present invention, no off-the-shelf or custom device can provide the high electrical power, high rotational speeds and large through bore diameters to, for example, rotating ultrasonically actuated (or activated) drill bits.

Polarized electrostrictive, also referred to as "piezoelectric", materials generate a voltage when compressed and conversely will change shape when an electric field is applied across the material.

While piezoelectricity has been known since the 1800s, many new materials and post processing techniques have been developed to enhance the performance of these materials. One such ceramic material is called lead zirconate titanate (often referred to as "PZT"). PZT is commonly used as an electromechanical transducer and is often stacked in layers in order to achieve desired mechanical (deformation) and electrical properties. When stacked, each layer is separated from the adjacent layer by a conductive layer or coating. Each segment of the final layered assembly is individually "electrically" energized, and the resulting deformation is the sum of the deformation of the individual layers. When used to convert mechanical forces to electricity, each layer is electrically connected in such a manner to extract the desired amount of electrical energy as the layers are compressed.

SUMMARY OF THE INVENTION

The present invention teaches several configurations where piezoelectric materials may be used to generate mechanical energy and apply said energy into a high-speed rotating object and subsequently transform the applied mechanical energy to electrical energy for the purposes of driving rotating electric-powered objects. The device has a stationary module that is connected to an electrical source; and has a rotatable module, which is not connected to an electric source. Each of the stationary and the rotatable module comprise a piezoelectric component inside of them. The rotatable module rotates relative to the stationary module. When the stationary module is electrically energized, the stationary piezoelectric component inside it expands and causes the rotatable piezoelectric component to compress. When the rotatable piezoelectric component compresses, it generates electrical power usable inside the rotatable portion of the apparatus. There are numerous applications for piezoelectric materials: actuators, acoustic transducers (speakers), x-y galvanometers, microphones, just to name a few. In addition, because in the present invention, there are no moving electrical contacts and all the electrical connections can be hermetically sealed, this device and be more safely used in explosives environments than traditional slip rings.

DETAILED DESCRIPTION

Figure 1:
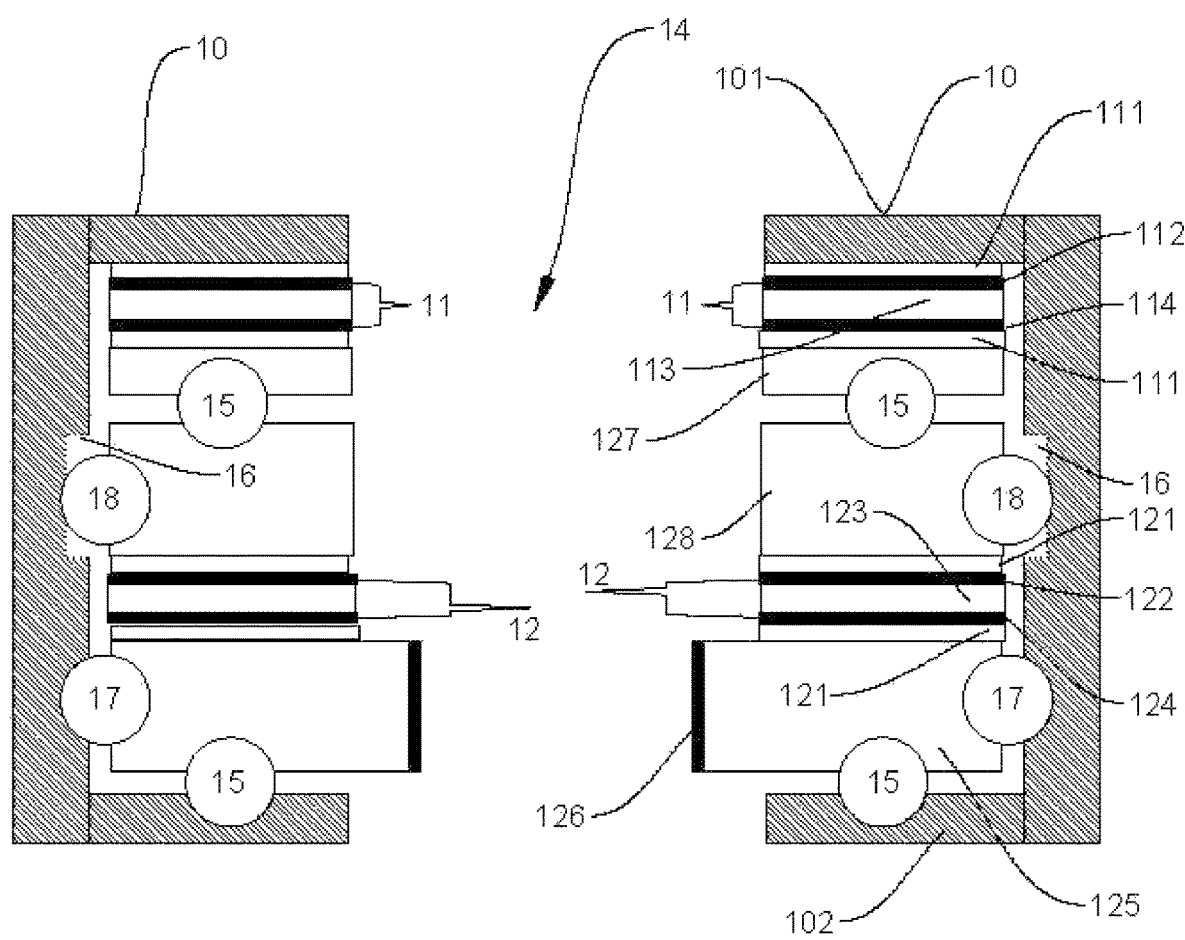
FIG. 1 is a cutaway side view of one embodiment of the device.

As shown in FIG. 1, one embodiment of the device comprises an outer housing unit 10 which can be hollowed-out to have an inside wall, an outside wall, a top 101 and a bottom 102. The outer housing unit 10 can be a cylindrical disk having a centrally aligned cavity 14 in the top 101 and the bottom 102. Attached to the inside of the top 101 of the outer housing unit 10 is an insulated stationary piezoelectric module 11. The insulated stationary piezoelectric module 11 is a stack of materials comprising one set of electrical insulators 111, an electrical contact 112 (which can, for example, be in the shape of a ring or a washer, or can be a surface coating) in direct contact with one side of the stationary piezoelectric component 113 and the other side of stationary piezoelectric component 113 is in direct contact with the electrical contact 114 (which can, for example, be in the shape of a ring or a washer, or can be a surface coating). The stationary piezoelectric component 113 is sandwiched between electrical contacts 112 and 114 and the electrical contacts 112 and 114 are insulated from a first bearing assembly, which could include, for example, deep groove ball bearing raceway 127 and the outer housing unit 10 by the electrical insulators 111. The bearing assembly can be selected from the group consisting of a sleeve bearing, ball bearing, roller bearing, ball thrust bearings, roller thrust bearings, tapered thrust bearings and fluid ball bearing.

Below the insulated stationary piezoelectric module 11, a rotatable module 12 is located. The rotatable module 12 can be, for example, a ring or a washer. The rotatable module 12 is a stack of materials comprising one set of electrical insulators 121, an electrical contact 122 (which can, for example, be in the shape of a ring or a washer, or can be a surface coating) in direct contact with one side of the rotatable piezoelectric component 123 and the other side of rotatable piezoelectric component 123 is in direct contact with the electrical contact 124 (which can, for example, be in the shape of a ring or a washer, or can be a surface coating). The rotatable piezoelectric component 123 is sandwiched between electrical contacts 122 and 124 and the electrical contacts 122 and 124 are insulated from deep groove ball bearing raceway assemblies 125 and 128 and the outer housing 10 by the electrical insulators 121. Electrical contacts 122 and 124 are used to connect any electrical devices in the rotating section of the disclosed device to the electrical energy output of the rotatable piezoelectric component 123. In this embodiment, an active ultrasonically enhanced drill bit assembly or other rotating shaft assembly can be extended through the hole or cavity 14 in housing 10 and can be mechanically attached to the rotatable portion of the device at contact area 126.

The stationary module 11 and the rotatable module 12 can be connected by ball bearings 15 running in races or track assemblies 127 and 128 in between the stationary module 11 and the rotatable piezoelectric module 12. The rotatable module 12 also comprises ball bearings 15 in a race or track formed underneath it between the rotatable module 12 and the bottom 102 of the inside of the housing 10.

In one embodiment, the rotatable module 12 can also have a second bearing assembly 17 between the race or track assembly 125 and the housing 10. In one embodiment, the rotatable module 12 can also have additional ball bearings 18 in a slotted 16 race or track assembly 128 and housing 10.

Figure 2:
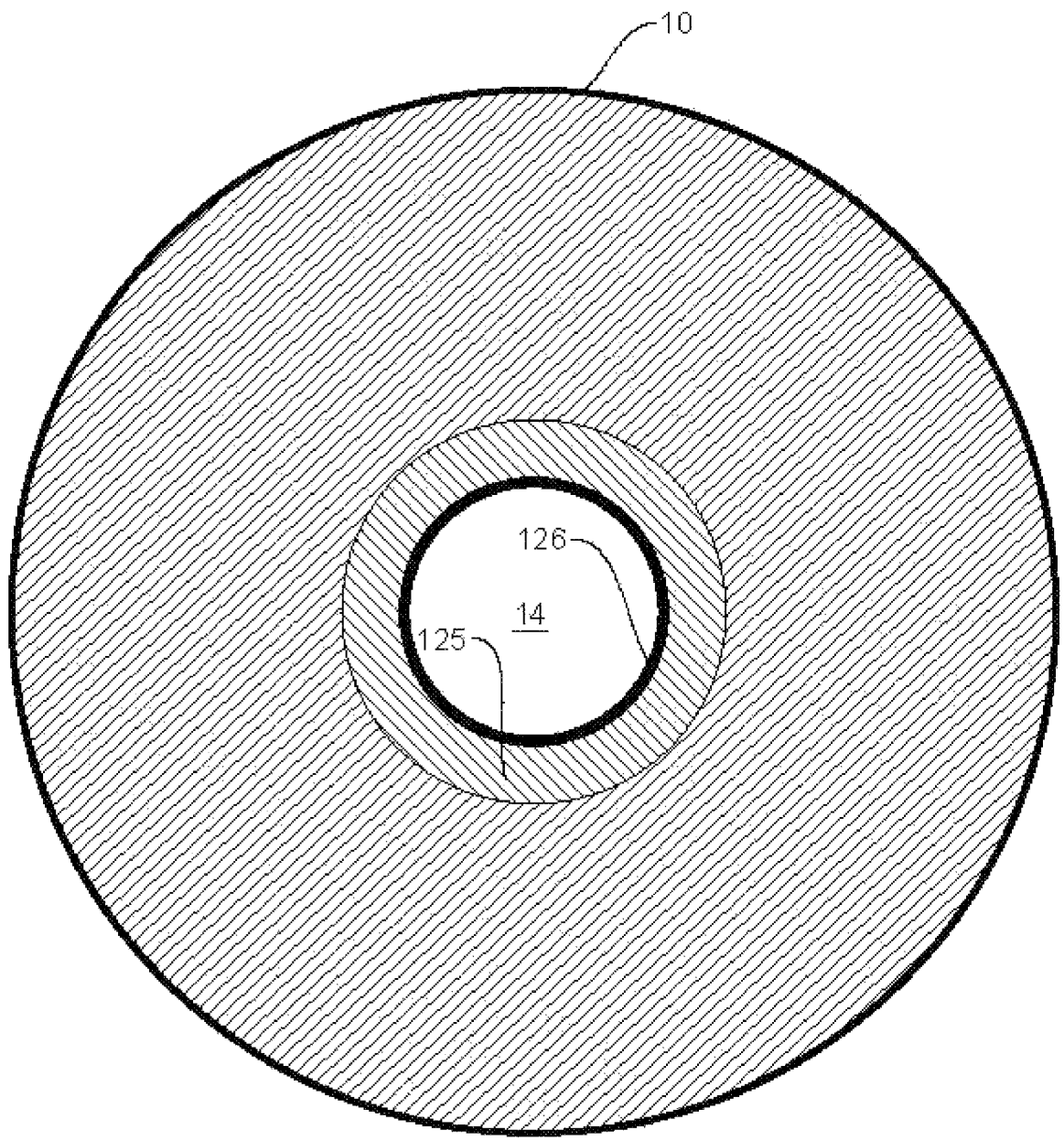
FIG. 2 is a top through view of one embodiment of the device.

FIG. 2 is a top view of the device of the invention as described herein. The following components are visible in the top view: the housing 10, the cavity 14, track assembly 125 and contact area 126 of the rotatable module 12.

Figure 3:
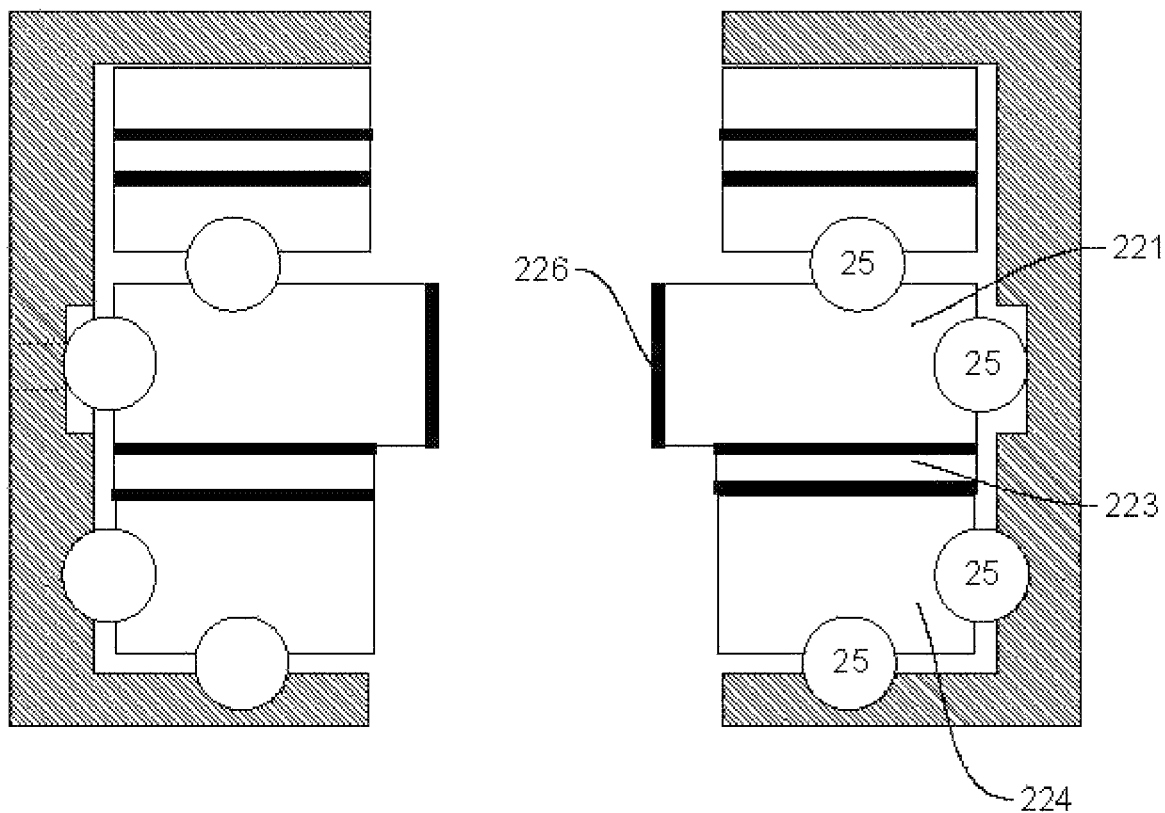
FIG. 3 is cross sectional side view of one embodiment of the device.

The embodiment shown in FIG. 3 is identical to the embodiment shown in FIG. 1, except that the mechanical connections to the rotating shaft or drill bit are placed at location 226. As the rotational piezoelectric material is compressed and uncompressed, this alternate configuration allows linear motion (vibrations) to be imposed on the drill bit or other object mechanically attached at location 226. Furthermore, it is shown in FIG. 3 that ball bearings 25 allow the rotatable portions 221, 223, and 224 to rotate relative to the stationary portions.

Figure 4:
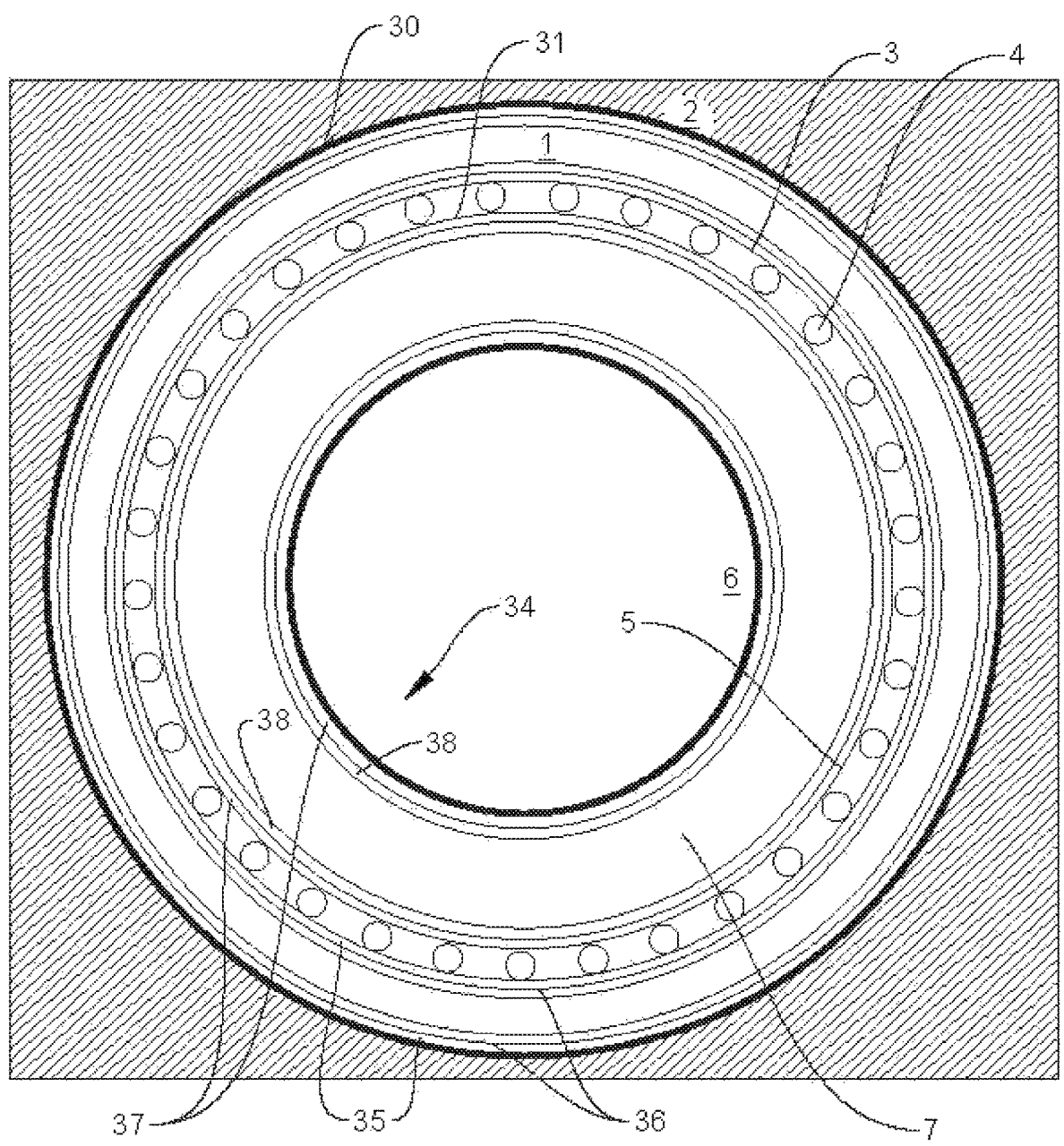
FIG. 4 is a cross sectional top view of one embodiment of the device.

FIG. 4 shows another embodiment of the device that comprises a stationary module 30 and a rotatable module 31. The stationary module 30 comprises an outer wall made of non-flexible and non-expandable material 2, insulating layers 35 and conducting layers 36, a stationary piezoelectric component 1, and flexible outer race 3 for ball bearings 4. The rotatable module 31 comprises of insulating layers 37 and conducting layers 38, a rotatable flexible inner race 5 for the ball bearings 4, a rotatable piezoelectric component 7, and an inner wall 6 made of non-flexible and non-expandable material. There is a cavity 34 at a center of the device formed by an inner wall 6. The rotatable module 31 rotates on the ball bearings 4 located between the stationary unit 30 and the rotatable unit 31.

Figure 5:
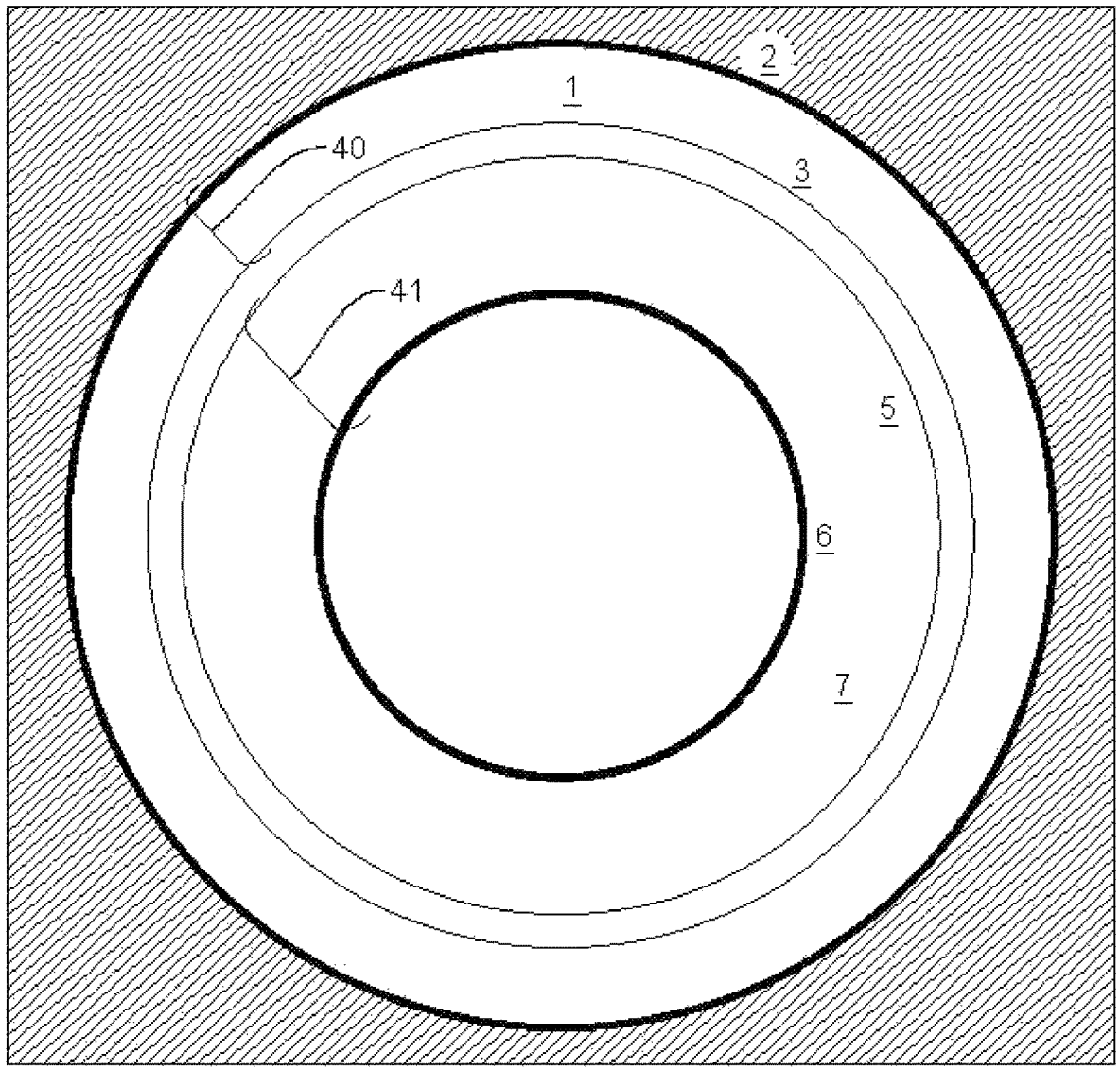
FIG. 5 is a cross sectional top view of one embodiment of the device.

The embodiment shown in FIG. 5 is similar to the embodiment of FIG. 4, except that instead of a race and ball bearings the device comprises a sleeve bearing, or a fluid filled bearing between the stationary unit 40 and the rotatable unit 41.

Method of Use

Figure 6:
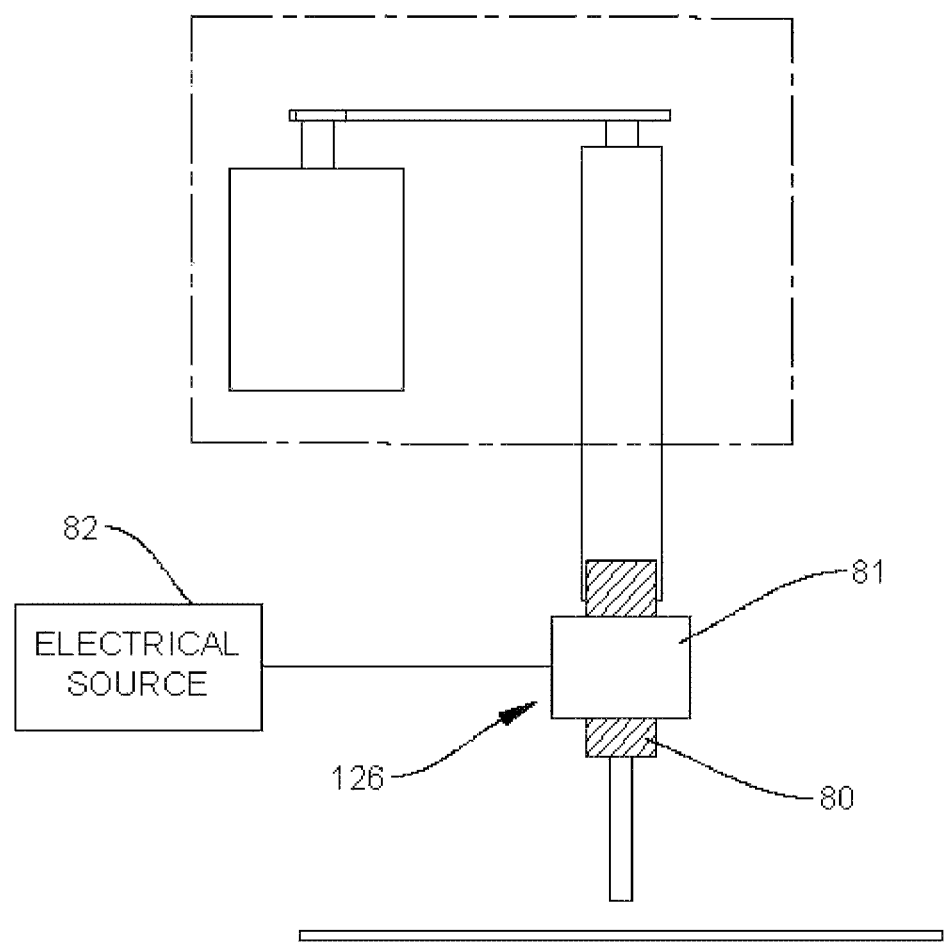
FIG. 6 is a labeled diagram of the parts of a basic drill press.

The method of using the embodiment of the device shown in FIG. 1 on a drill press comprises aligning, but not attaching the holes 14 in the housing 10 of the device to the chuck of the drill press (See FIG. 6), the drill bit aligned in the center of the bore of the device and only touching the device mechanically at contact point 126 identified in FIG. 6. In the active ultrasonic drilling system shown in FIG. 6, 80 is surrounded by the disclosed invention 81.

In continued reference to FIG. 6 and FIG. 1, electricity is applied to the present device by electrical source 82 and connected to the stationary portion of the disclosed invention. When electricity is applied to the stationary module 11 at contacts 112 and 114, an electric field will develop across the stationary piezoelectric component 113. The stationary piezoelectric component 113 expands in the presence of an electric field. When the stationary piezoelectric component 113 expands, it exerts a compression force on the lower rotating piezoelectric module 12 through bearing assembly 127, bearing 15 and bearing assembly 128. Compression of the rotatable piezoelectric component 123 in turn generates an electrical potential across contacts 122 and 124. The electrical output of the rotatable piezoelectric component 123 can be used to drive an active ultrasonic drill bit or other rotating electrical device. By powering the rotating electrical devices in this manner, electrical accessories may be placed directly in or on the drill bit without requiring a direct electrical connection via slip rings to the drill press.

The method of using the embodiment of the device shown in FIG. 4 on a drill press comprises aligning the bore or hole 34 of the device with the chuck of a drill press, the drill bit aligned in the center of the bore or hole of the device and mechanically connecting the shaft or rotating object to inner ring 6. When electricity is applied to the stationary module 30 at the outer wall 2 via contact points 36, the stationary module 30 becomes energized by applying a voltage across stationary piezoelectric component 1 via contacts 36. The stationary piezoelectric component 1 expands when the electric field is applied. When the stationary piezoelectric component 1 expands, it exerts force on the flexible outer race 3 and the ball bearings 4. The ball bearings 4 exert force on the flexible inner race 5 and compress the rotatable piezoelectric component 7. When compressed, the rotatable piezoelectric component 7 generates electricity which can be accessible via electrical contact surfaces 38.

What is claimed is:
1. An electrical power transfer device comprising:
a hollowed-out housing unit comprising: a top, a bottom, an inside wall, an outside wall and a centrally aligned cavity that is open to the top and bottom of the hollowed-out housing unit;
an insulated stationary piezoelectric module attached to the inside wall of the hollowed-out housing unit and couplable to an electrical source;
a rotatable piezoelectric module located beneath the insulated stationary piezoelectric module that is operably connected to the insulated stationary piezoelectric module and configured to mechanically and electrically couple to an electrically powered rotatable shaft of a rotatable device inserted into the centrally aligned cavity; and
a first bearing assembly running in at least one first track assembly sandwiched between and connecting the insulated stationary piezoelectric module and the rotatable piezoelectric module.

2. The electrical power transfer device of claim 1, wherein the first bearing assembly is selected from the group consisting of a sleeve bearing, ball bearing, roller bearing, ball thrust bearings, roller thrust bearings, tapered thrust bearings and fluid ball bearing.

3. The electrical power transfer device of claim 1, wherein the insulated stationary piezoelectric module and the rotatable piezoelectric module comprise lead zirconate titanate.

4. The electrical power transfer device of claim 1, wherein the electrical power transfer device further comprises two electrical contacts, and wherein the insulated stationary piezoelectric module is sandwiched between the two electrical contacts that are insulated from the at least one first track assembly.

5. The electrical power transfer device of claim 4, wherein the two electrical contacts are selected from the group consisting of a ring, a washer, and a surface coating.

6. The electrical power transfer device of claim 5, wherein the rotatable piezoelectric module is sandwiched between the two electrical contacts that are insulated from the at least one first track assembly.

7. The electrical power transfer device of claim 6, wherein the two electrical contacts that sandwich the rotatable piezoelectric module connect to an electrically powered rotatable device.

8. The electrical power transfer device of claim 7, wherein the rotatable piezoelectric module further comprises a second bearing assembly in a second track assembly sandwiched between the rotatable module and the bottom of the hollowed-out housing unit.

9. A method comprising:
inserting a machining tool component of a rotatable electrical device into a cavity located within an electric transfer device said device comprising an insulated stationary piezoelectric module and an insulated rotatable piezoelectric module that are connected by a first bearing assembly running in a first track assembly located between the insulated stationary piezoelectric module and the rotatable piezoelectric module;
connecting the machining tool component to mechanical contact points on a second bearing assembly operably connected to and positioned beneath the rotatable piezoelectric module;
connecting the machining tool component to electrical contact points on the rotatable piezoelectric module;
applying electricity to a first electrical contact within the insulated stationary piezoelectric module;
generating an electric field across the insulated stationary piezoelectric module, wherein the insulated stationary piezoelectric module expands in the presence of the electric field and exerts a compression force on the rotatable piezoelectric module that subsequently generates an electrical potential across a pair of electrical contacts located on the rotatable piezoelectric module; and
powering the rotatable electrical device by an electrical output from the pair of electrical contacts located on the rotatable piezoelectric module.

10. The method of claim 9, wherein the first bearing assembly and the second bearing assembly are selected from the group consisting of a sleeve bearing, ball bearing, roller bearing, ball thrust bearings, roller thrust bearings, tapered thrust bearings and fluid ball bearing.

11. The method of claim 9, wherein the insulated stationary piezoelectric module and the rotatable piezoelectric module comprise lead zirconate titanate.

12. An electrical power transfer device, comprising:
a stationary module encircling a rotatable module that is operably connected to the stationary module and a bearing assembly located between the stationary and rotatable modules;
the stationary module comprising insulating layers, conducting layers and a stationary piezoelectric component that are sandwiched between a non-flexible and non-expandable outer wall and a flexible outer race for the bearing assembly; and
the rotatable module comprising insulating layers, conducting layers and a rotatable piezoelectric component that are sandwiched between a rotatable flexible inner race for the bearing assembly and a non-flexible and non-expandable inner wall that forms a centrally aligned cavity within the electrical power transfer device,
wherein the rotatable module is rotatable on the bearing assembly.

13. The electrical power transfer device of claim 12, wherein the rotatable module further comprising mechanical contact points on a second bearing assembly adjacent and operably connected to the rotatable module.

14. The electrical power transfer device of claim 13, wherein the stationary module further comprising a first electrical contact.

15. The electrical power transfer device of claim 14, wherein an electrically powered rotatable shaft is inserted into the centrally aligned cavity and mechanically connected to the mechanical contact points.

16. The electrical power transfer device of claim 15, wherein applying electricity to the first electrical contact generates an electric field across the stationary module that causes the stationary piezoelectric component to expand and the rotatable piezoelectric component to compress, generating an electrical potential across the pair of electrical contacts and powering the electrically powered rotatable shaft.

17. The electrical power transfer device of claim 12, wherein the bearing assembly between the stationary module and the rotatable module comprises a ball bearing system.

18. The electrical power transfer device of claim 12, wherein the bearing assembly between the stationary module and the rotatable module comprises a fluid filled bearing system.

* * * * *